April 3, 1945.  J. PELENBERG  2,372,978

ELECTRIC EGG COOKER

Original Filed Aug. 27, 1941  2 Sheets-Sheet 1

INVENTOR
Joseph Pelenberg
BY
ATTORNEY

April 3, 1945. J. PELENBERG 2,372,978
ELECTRIC EGG COOKER
Original Filed Aug. 27, 1941  2 Sheets-Sheet 2
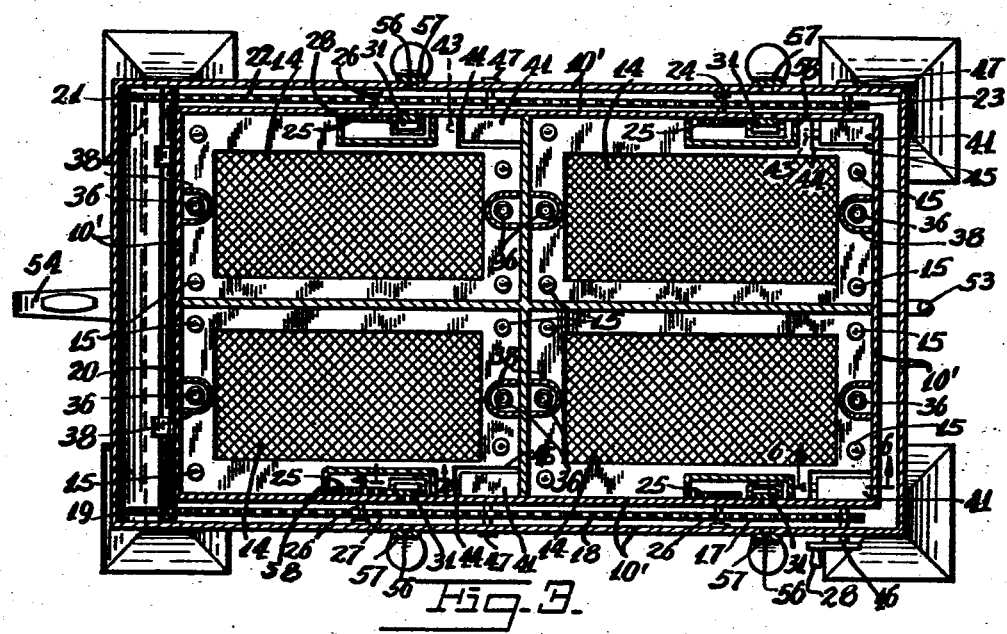
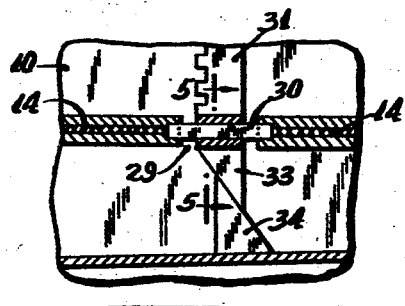
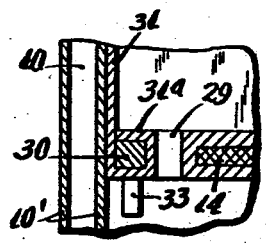
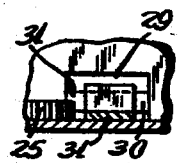
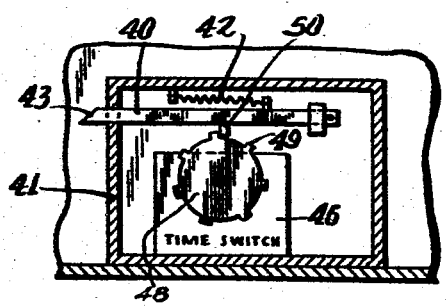
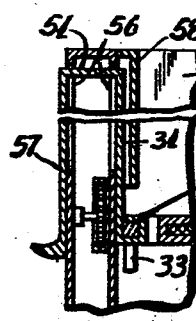
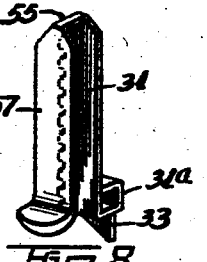
INVENTOR
Joseph Pelenberg
BY
ATTORNEY.

Patented Apr. 3, 1945

2,372,978

UNITED STATES PATENT OFFICE 2,372,978

ELECTRIC EGG COOKER

Joseph Pelenberg, New York, N. Y.

Substituted for abandoned application Serial No. 408,433, August 27, 1941. This application March 28, 1944, Serial No. 528,415. In Canada September 19, 1941

4 Claims. (Cl. 219—44)

This invention relates to new and useful improvements in an electric egg cooker. This application is a substitute for my abandoned application filed on August 27, 1941, Serial Number 408,-433.

The invention proposes an electric egg cooker which is characterized by several vertical compartments into which eggs may be placed, and an arrangement whereby these eggs may be lowered into boiling water to boil them.

Still further a mechanism is proposed which includes a time device arranged to project the boiled eggs out of the water after a predetermined time.

A construction is contemplated wherein a perforated support member is located in each compartment upon which the eggs may be rested. A construction is also proposed whereby one or more of these support members may be lowered individually, or simultaneously by the operation of a single control handle, to immerse the eggs.

For further comprehension of the invention, and of the objects and advantages thereof, reference will be had to the following description and accompanying drawings, and to the appended claims in which the various novel features of the invention are more partiicularly set forth.

In the accompanying drawings forming a material part of this disclosure:

Fig. 3 is a horizontal sectional view taken on the line 3—3 of Fig. 2.

Fig. 4 is a fragmentary enlarged vertical sectional view taken on the line 4—4 of Fig. 3, but illustrated with the support member in its lowered position.

Fig. 5 is a fragmentary sectional view taken on the line 5—5 of Fig. 4.

Fig. 6 is a fragmentary enlarged sectional view taken on the line 6—6 of Fig. 3.

Fig. 7 is a fragmentary vertical sectional view taken on the line 7—7 of Fig. 2.

Fig. 8 is a perspective view of one of the parts used in the device.

Fig. 9 is a fragmentary enlarged detailed view of a portion of Fig. 3.

Figure 1:
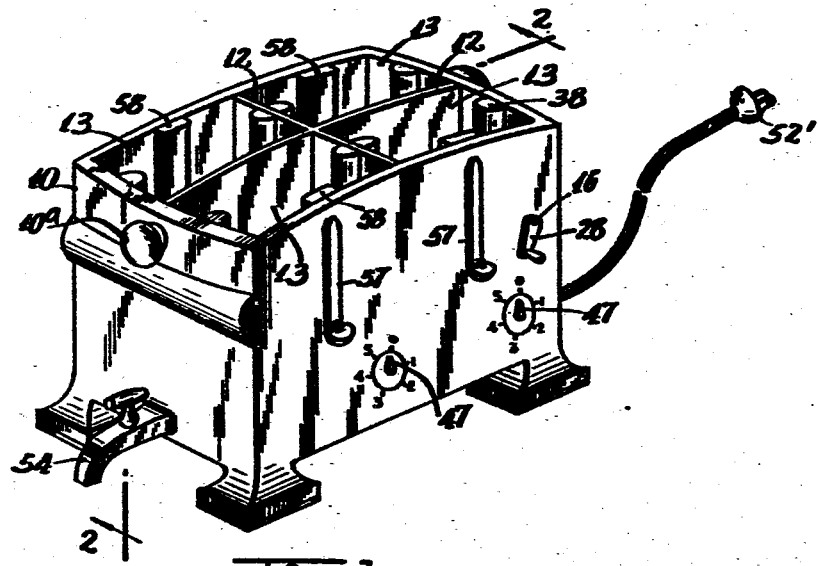
Fig. 1 is a perspective view of an electric egg cooker constructed in accordance with this invention.
Figure 2:
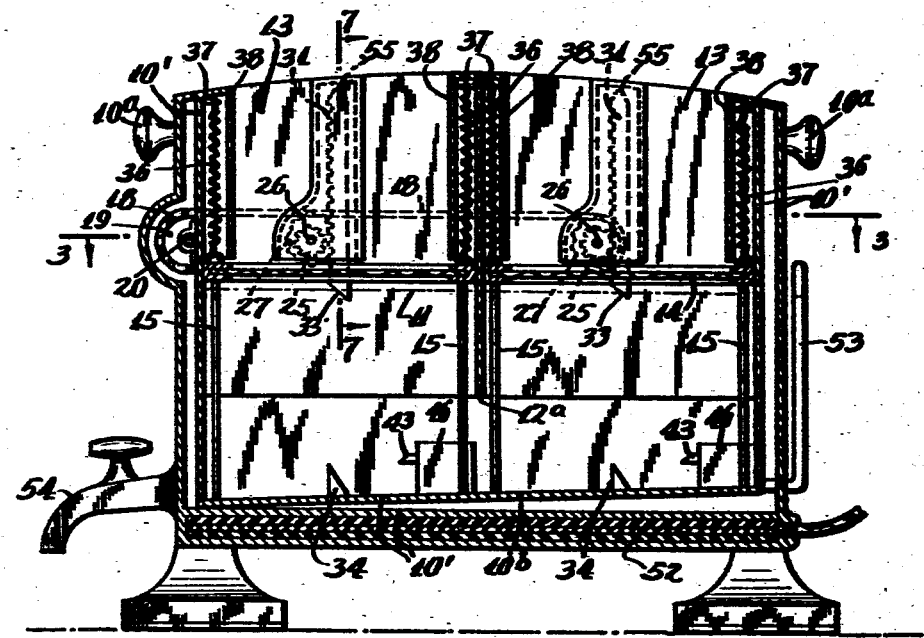
Fig. 2 is a vertical sectional view taken on the line 2—2 of Fig. 1.

The electric egg cooker, in accordance with this invention, includes a double wall container 10 having an open top, and adapted to hold water to a level at least midway of the top and bottom thereof, as schematically indicated in Fig. 2, by the dot and dash line 11. This line indicates the top level of the water. A plurality of vertical partitions 12 divide the top portion of the container 10 into a plurality of separate compartments 13. The partitions 12 do not extend all the way down to the bottom of the container. They terminate at the bottom edges 12ª, see Fig. 2. These points of termination are below the water level 11. A perforated support member 14 is mounted within each of the compartments 13 and is normally located above the water level 11. Two eggs superimposed on each other may be rested upon each support member 14 while it is in its raised position, as illustrated in Fig. 2. Means is provided for guiding each support member 14 to move in a vertical path. This means includes a plurality of vertical rods 15 mounted upon the bottom of the container 10 and extended upwards through openings in the corners of the support members 14.

Means is provided for mechanically lowering said support member 14 to immerse the eggs into the water of the container. This means includes a shaft 16 mounted through the double wall of the container 10 and supporting a sprocket 17 between the walls thereof which is engaged by a chain 18.

The chain extends over another sprocket 19 on a shaft 20 rotatively supported across one end of the double wall container 10. The shaft 20 is provided with another sprocket 21 engaged by another chain 22 which extends over a sprocket 23 located between the double walls of one of the other sides of the container and supported on another shaft 24. The shaft 24 extends to the interior of the double walled container 10. A gear 25 is mounted on the inner end of this shaft. This gear is located in one of the compartments 13. The other compartments 13 are provided with similar gears 25 which are on shafts 26 rotatively supported and provided with sprockets 27 meshing with chains 18 and 22. A handle 28 is mounted on the outer end of the shaft 16. The arrangement is such that when the handle 28 is rotated the gears 25 will be turned.

Each support member 14 has an opening 29 adjacent one of said gears 25. A square rod 30 is mounted across each opening 29. A vertical rack 31 for each rod 30 has its bottom end 31ª turned around the square rod 30 and extends upwards. Each rack 31 will frictionally maintain a stationary position. A cam 33 is mounted upon the bottom end of each rack 31 and each cam 33 is cooperative with a complementary cam 34 mounted on the bottom of the container 10. The arrangement is such that normally each rack 31 is out of mesh with the adjacent gear 25. However, each rack 31 may be manually moved towards the gear 25 to mesh with it.

In Fig. 2 the rack 31 at the right is shown in its moved position meshing with the gear 25, while the rack 31 at the left is in its normal position, out of mesh. Thus one or more of the racks 31 may be meshed with one or more of the gears 25. When the handle 28 is turned to turn the gears 25 and the racks 31 which mesh with the gears 25 will be forced downwards and thus move the support member or members 14 to which they are connected, downwards. When the support members 14 reach their bottom positions the cams 33 and 34 will engage each other and the racks 31 will be forced laterally to disconnect from the gears 25.

Resilient means is provided for urging each support member 14 into a raised position. This resilient means consists of springs 36 connected between opposite sides of each support member 14 and extended upwards and connected with lugs 37 stationarily mounted on the container 10. Small tubular casings 38 are mounted over the lugs 37 and over the springs 36 to house them. These tubular casings 38 are open at their bottom ends.

Means is provided for holding each support member 14 in its lowered position. This means includes a bolt 40 for each support member 14 mounted in and projecting from a housing 41 located upon the bottom of the container 10. A spring 42 normally urges each bolt 40 outwards. Each bolt 40 has a beveled outer end 43 adapted to be engaged by the edge 44 of a cutout 45 in its cooperative support member 14 to force the bolt inwards when the support member goes down, and then to permit the bolt to engage on top of the support member 14 to hold it down. Within each housing 41 there is a time switch 46 mounted in an electric circuit, not shown on the drawing, and which may be set to go off at a preselected time, such as one minute, two minutes, etc., as desired. For this purpose, each time switch 46 is provided with a control handle mounted on the outside of the container 10 by which it may be set. Each time switch 46 is provided with an operator wheel 48 having small projections 49 selectively engageable with a projection 50 on its cooperative bolt 40. When said time switch 46 operates the wheel 48 turns one projection 49, which engages the projection 50 and momentarily retracts the bolt 40. This frees the support member 14 which is immediately moved upwards by the springs 36.

The upper end of each rack 31 continues into a small narrow neck portion 55 which extends through vertical slots 56 formed in the upper portions of the double wall of the container 10. The neck portion 55 continues into a downwardly extending handle 57 which normally covers the outermost slot 56 when the rack 31 is in its elevated position. The slots 56 are sufficiently wide in relation to the neck portion 55 so that the rack 31 may be moved laterally. A casing 58 for each rack 31 with a closed top and and open bottom is mounted on the inner wall of the container 10 and, extends over the top portions of the racks 31. The racks 31 may be moved laterally to engage their teeth with the teeth of the gears 25 by reaching down and gripping the bottom of ends 31ª of the racks 31. Each support member 14 may be manually, individually moved to its down position by manually moving its handle 57 downwards.

The container 10 is shown to have double walls indicated by reference numeral 10'. An electric heater 52 is mounted at the bottom of the container 10 for supplying heat to boil the water and may receive its current from plug 52'. A water gauge 53 is mounted on the side of the container 10. The bottom 10ᵇ of the container is inclined so that the water may be easily drained. A control cock 54 is provided for this purpose.

The operation of the device is as follows:

The container 10 is filled with water to the level indicated by numeral 11. The heater 52 is set into operation so that the water boils. Eggs may be dropped into the compartments 13 to rest on the support members 14. The racks 31 of these support members are moved laterally so that they engage the gears 25. The handle 28 is then turned to rotate the gears 25 and so move the racks 31 downwards. This moves the particular support members 14 downwards and immerses the eggs beneath the water level 11.

When the support member or members 14 reach their bottom positions the cams 33 and 34 engage each other, and cause the rack or racks 31 to move laterally from the gears 25. In the bottom position of the support members 14, the bolts 43 catch and hold them. After a predetermined time, as determined by the time switch 46, the bolt or bolts 43 will be momentarily retracted by the time switch or switches, freeing the support members 14. Each time switch 46 may be selectively set. When a support member 14 is freed the springs 36 will move it to its raised position. The resistance of the water will prevent the support member 14 from moving up too rapidly, which may cause damage to the eggs.

Each one of the support members 14 may be individually manually moved downwards by merely gripping the handle 57 of the particular support member and moving the handle downwards so that the neck portion 55 moves down the slots 56, and the rack 31 which is connected with the support member 14, moves the support member 14 downwards. In this way each support member 14 may be moved to its bottom position in which it is caught and held by the bolt 43.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An electric egg cooker having an open top container adapted to hold water to a level at least about midway of its top and bottom and having its interior divided into a plurality of separate compartments with a perforated support member upon which eggs are adapted to be rested within each of said compartments, a plurality of vertical rods attached to the bottom wall of said container and passed through openings in said support member for guiding them to move vertically, resilient means urging said support members into a normal raised position above said water line, means on the top ends of said rods limiting upward movement of said support members to said normal raised position, racks mounted on each of said support members and extending vertically along an outside wall of said container, rotatively supported gears meshing with said racks, a transmission system connecting said gears together for unitary movement causing said gears to be rotated to move said racks and the support members mounted thereon downwards against the holding action of said resilient means, said support members being formed with non-circular rods, said racks having their bottom ends bent around said rods to laterally slidably attach said racks to said support members, and means mounted on the top ends of said racks, whereby said racks may be moved laterally of said support members to be disengaged from said gears to be individually moved downwards independently of said transmission system.

2. An electric egg cooker having an open top container adapted to hold water to a level at least about midway of its top and bottom and having its interior divided into a plurality of separate compartments with a perforated support member upon which eggs are adapted to be rested within each of said compartments, a plurality of vertical rods attached to the bottom wall of said container and passed through openings in said support member for guiding them to move vertically, resilient means urging said support members into a normal raised position above said water line, means on the top ends of said rods limiting upward movement of said support members to said normal raised position, racks mounted on each of said support members and extending vertically along an outside wall of said container, rotatively supported gears meshing with said racks, a transmission system connecting said gears together for unitary movement causing said gears to be rotated to move said racks and the support members mounted thereon downwards against the holding action of said resilient means, said support members being formed with non-circular rods, said racks having their bottom ends bent around said rods to laterally slidably attach said racks to said support members, and means mounted on the top ends of said racks, whereby said racks may be moved laterally of said support members to be disengaged from said gears to be individually moved downwards independently of said transmission system, said rods being extended across the open side of openings extended inwards from the edges of said support members so that racks may be easily bent therearound.

3. An electric egg cooker having an open top container adapted to hold water to a level at least about midway of its top and bottom and having its interior divided into a plurality of separate compartments with a perforated support member upon which eggs are adapted to be rested within each of said compartments, a plurality of vertical rods attached to the bottom wall of said container and passed through openings in said support member for guiding them to move vertically, resilient means urging said support members into a normal raised position above said water line, means on the top ends of said rods limiting upward movement of said support members to said normal raised position, racks mounted on each of said support members and extending vertically along an outside wall of said container, rotatively supported gears meshing with said racks, a transmission system connecting said gears together for unitary movement causing said gears to be rotated to move said racks and the support members mounted thereon downwards against the holding action of said resilient means, said racks having their bottom ends movably attached to their respective support members, and handles attached to the top ends of said racks and projected through enlarged openings formed in the walls of said container above said water line, whereby said racks may be moved relative to said support members and out of mesh with said gears so that said support members may be individually moved downwards independently of said transmission system.

4. An electric egg cooker having an open top container adapted to hold water to a level at least about midway of its top and bottom and having its interior divided into a plurality of separate compartments with a perforated support member upon which eggs are adapted to be rested within each of said compartments, a plurality of vertical rods attached to the bottom wall of said container and passsed through openings in said support member for guiding them to move vertically, resilient means urging said support members into a normal raised position above said water line, means on the top ends of said rods limiting upward movement of said support members to said normal raised position, racks mounted on each of said support members and extending vertically along an outside wall of said container, rotatively supported gears meshing with said racks, and a transmission system connecting said gears together for unitary movement causing said gears to be rotated to move said racks and the support members mounted thereon downwards against the holding action of said resilient means, said racks having their bottom ends laterally slidably attached to their respective support members, and handles attached to the top ends of said racks and projected through enlarged elongated slots formed in the walls of said container above said water line, whereby said racks may be moved laterally relative to said support members and out of mesh with said gears so that said support members may be individually moved downwards independently of said transmission system.

JOSEPH PELENBERG.